United States Patent [19]

Lindberg

[11] Patent Number: 4,930,616
[45] Date of Patent: Jun. 5, 1990

[54] ROTARY LOG SINGULATOR

[75] Inventor: Verne L. Lindberg, Everett, Wash.

[73] Assignee: Industrial Machine Development Manufacturing, Inc., Everett, Wash.

[21] Appl. No.: 235,240

[22] Filed: Aug. 19, 1988

[51] Int. Cl.$^5$ .............................................. B65G 37/00
[52] U.S. Cl. ............................... 198/463.6; 414/746.4; 221/251
[58] Field of Search .......................... 198/463.4–463.6; 414/746.4; 221/251

[56] References Cited

U.S. PATENT DOCUMENTS

| | | | |
|---|---|---|---|
| 3,039,588 | 6/1962 | Harnack | 198/463.4 |
| 3,235,101 | 2/1966 | Milhaupt | 198/463.6 |
| 3,835,978 | 9/1974 | Hartzell et al. | 198/463.4 |
| 4,298,141 | 11/1981 | Ramunas | 221/251 |
| 4,596,326 | 6/1986 | Yautz | 198/463.6 |

FOREIGN PATENT DOCUMENTS

| | | | |
|---|---|---|---|
| 474862 | 12/1953 | Italy | 198/463.5 |
| 31430 | 2/1985 | Japan | 414/746.4 |
| 507500 | 3/1976 | U.S.S.R. | 198/463.5 |
| 1219497 | 3/1986 | U.S.S.R. | 198/463.6 |

*Primary Examiner*—Joseph E. Valenza
*Attorney, Agent, or Firm*—Mark Zovko

[57] ABSTRACT

A rotary log singulator for singulating logs received from an intake station to a downstream discharge station. The apparatus includes at least two longitudinally displaced rotating drums and at least one lifting and separating bar located adjacent to and upstream of the drums. The rotating drums have two perimeter portions defined by two chord stretches joined at an outwardly facing obtuse angle. Logs received by the drums are supported and rotationally transferred within the perimeter portions defined by the chord stretches. The lifting and separating bars are driven by a shaft connected to or synchronized with the shaft which drives the rotating drums and are displaced vertically up and down as the rotating drums rotate. The timing cycle between the lifting and separating bars and rotating drums is such that when the first chord stretch of the perimeter portions of the drums is transverse to the lifting and separating bar, the lifting and separating the bar is in a lower position allowing a log to rest on the chord stretches of the drum. As the drum rotates the log toward the discharge station, the lifting and separating bars move vertically upward to separate the downstream log from other upstream logs and advance the downstream log onto the next perimeter portion of the drum if the center of gravity of the log is downstream of the separating surface of the lifting bar. As the lifting bars move upward, they also serve as a barrier to prevent other upstream logs from reaching the drum, thereby singulating logs. In a preferred embodiment, the lifting and separating bars are horizontally adjustable to enable the apparatus to effectively singulate a wide range of log diameter sizes.

2 Claims, 2 Drawing Sheets

ROTARY LOG SINGULATOR

BACKGROUND OF THE INVENTION

This invention relates in general to apparatus for facilitating the transfer of logs, and more particularly to apparatus which can separate laterally fed logs from an intake station, one at a time, to a suitable discharge station.

In a typical log deck, logs which are taken in for cutting into lumber are transferred, for example, from a conveyor into further processing machinery, such as a conventional log debarker or bucking system. Logs received by the conveyor must be separated by some means so that they are arranged end to end and separated so as to be delivered one at a time. In the prior art, many devices have been employed for this one-by-one feeding or log singulating. A patent search has discovered the following patents:

| Patent No. | Country | Inventor |
| --- | --- | --- |
| 1,892,670 | U.S.A. | Jaeger |
| 2,666,462 | U.S.A. | Richardson |
| 2,763,236 | U.S.A. | Cummings |
| 3,439,816 | U.S.A. | Archambeau et al |
| 3,502,191 | U.S.A. | Valo |
| 3,584,726 | U.S.A. | Hartzell |
| 4,245,735 | U.S.A. | Valo |
| 4,338,060 | U.S.A. | Swaby |
| 4,431,367 | U.S.A. | Pousette et al |
| 969,007 | Austria | Talbot |

A typical example of the devices used in the prior art of which applicant is familiar are the patents issued to Valo. The shortcoming of the device of U.S. Pat. No. 4,245,735, for example, is that reciprocating motion of the apparatus is relied upon to singulate the logs with attendant wear on the moving parts associated with that type of motion. Today's log diameter sizes are usually significantly smaller than sizes in past times, placing a greater load manifesting as a much higher cycling frequency on the machinery and more frequent breakdowns. The present invention, using rotary motion of its drums enables the apparatus to perform longer before parts begin wearing out. In the above array of patents, lifting bars as disclosed by applicant were not found. These bars provide a unique way of singulating logs not present in the prior art which reduces wear and tear on the machinery that presently is a major consideration in the present art. The present invention also allows singulation of a much wider range of log diameter sizes as opposed to the prior art.

SUMMARY OF THE INVENTION

The present invention includes apparatus for singulating logs fed from a log intake station by conventional feeding means to a discharge station downstream of the intake station and log feeder. The apparatus is located between a single layered log infeed and a discharge station and comprises at least two longitudinally displaced rotating drums and a series of lifting and separating bars adjacent to and upstream of the drums. The rotating drums have at least one perimeter portion (preferably two perimeter portions) defined by a first and second chord stretch. The first chord stretch is ideally somewhat shorter than the second chord stretch and this pair of chord stretches joins at an outwardly facing obtuse angle. This arrangement allows a log to be supported and rotationally transferred by the rotating drums when the log is located in the perimeter portion so described. The rotating drums are connected to a first shaft having a longitudinal axis parallel to the longitudinal axis of the logs to be singulated. At least two lifting and separating bars are adjacent to the rotating drums on the upstream side of the apparatus. The lifting and separating bars are connected to a second shaft or cylinder in such a manner that rotating of the second shaft or alternatively actuation of a cylinder produces vertical translational movement of the lifting and separating bars. The second shaft has a longitudinal axis parallel to the longitudinal axis of the first shaft and the logs to be singulated. The lifting and separating bars are spaced longitudinally between the rotating drums and are operatively associated with the drums such that when the first chord stretch is transverse to the lifting and separating bars, those bars are at a first lower position below the first chord stretch. This arrangement allows a log fed toward the rotating drums to rest on the first chord stretch. As the rotating drums rotate, the lifting and separating bars move vertically to a second upper position whereby logs upstream of the first chord stretch are prevented from contacting the rotating drums. A log having its center of gravity downstream of the separating surface of the lifting and separating bars is fed further into the perimeter portion of the rotating drums. To achieve this end, transmission means are provided which interconnect the first and second shafts so that rotation of the first shaft results in rotation of the second shaft and consequently vertical translational movement of the lifting and separating bars in accordance with the above described operational association between the rotating drums and lifting and separating bars. Preferably, the transmission means includes a first gear connected to the first shaft and a second gear connected to the second shaft wherein the drive ratio between said second and first gear is approximately 2:1. Also, the rotating drums may have one, two or more similar perimeter portions diametrically spaced on the rotating drums having first and second chord stretches as described above. Further, the lifting and separating bars, in order to accommodate a variety of log diameter sizes, have adjusting means connected to them so that those bars may be adjusted horizontally. A conventional piston and cylinder arrangement may accomplish this end as described subsequently in the specification.

It is therefore an object of the present invention to provide a log singulating apparatus which accomplishes log singulating using primarily rotational motion of the operative parts of the apparatus.

Another object of the present invention is to provide a log singulator which effectively singulates logs without relying on reciprocating motion of the parts of the apparatus.

A further object of the present invention is to provide a log singulator which expands the range of log diameters which can be effectively singulated.

Yet another object of the present invention is to provide a rotary log singulator which requires less manual attention as the present log singulators conventionally available.

Still another object of the present invention is to provide a log singulator which is adjustable for varying log diameter sizes.

These and other objects and advantages of the present invention will become more apparent from the fol-

DETAILED DESCRIPTION OF THE PREFERRED EMBODIMENT

Figure 1:
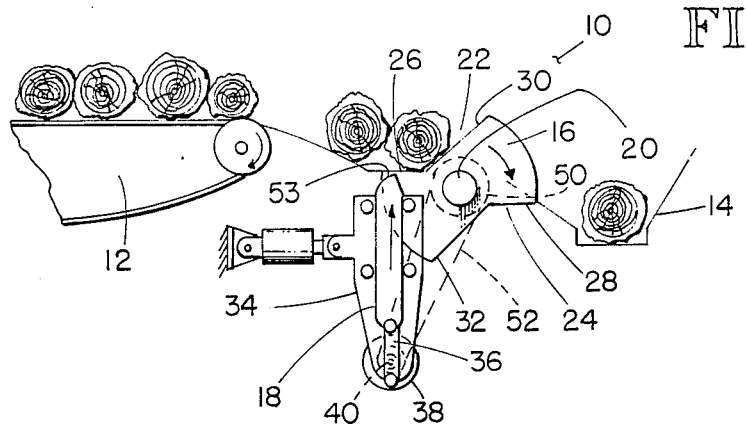
FIG. 1 is a side elevation view of the apparatus of the present invention at the point in the timing cycle in which the lifting and separating bar is at its lowest position.
Figure 2:
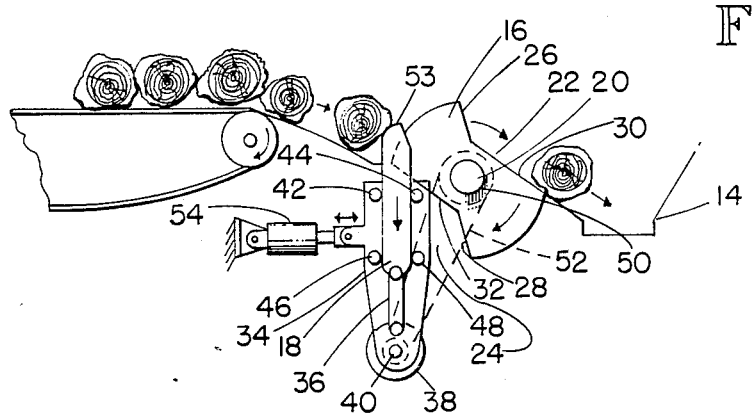
FIG. 2 is a side elevation view of the apparatus of the present invention at the point in the timing cycle in which the lifting and separating bar is at its highest position.
Figure 3:
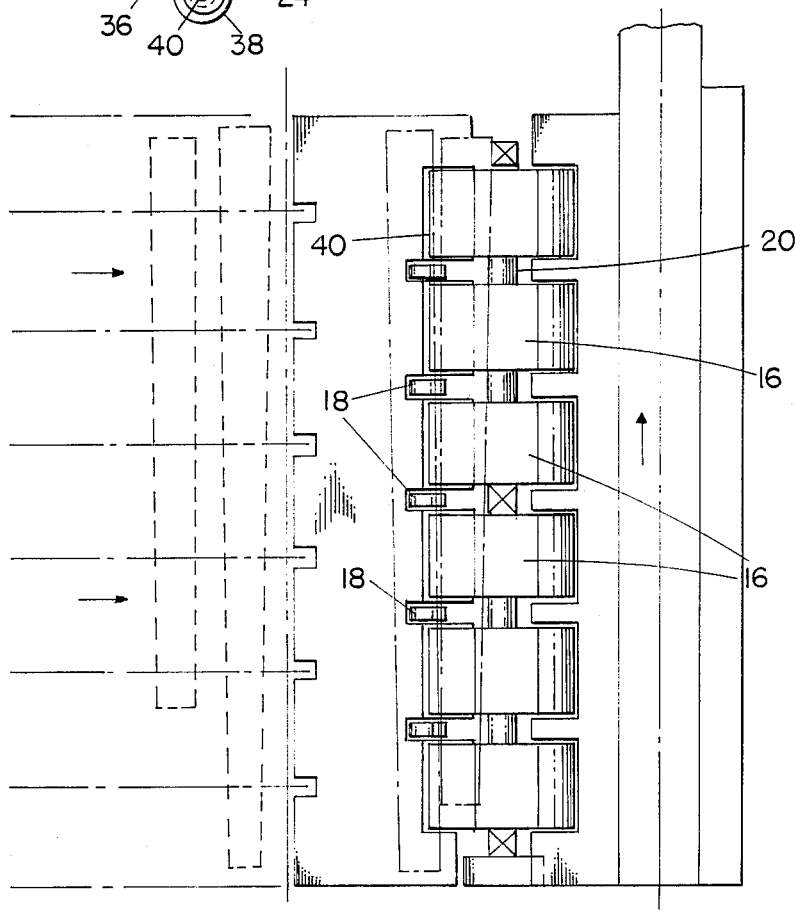
FIG. 3 is a plan view of the apparatus of the present invention.
Figure 4:
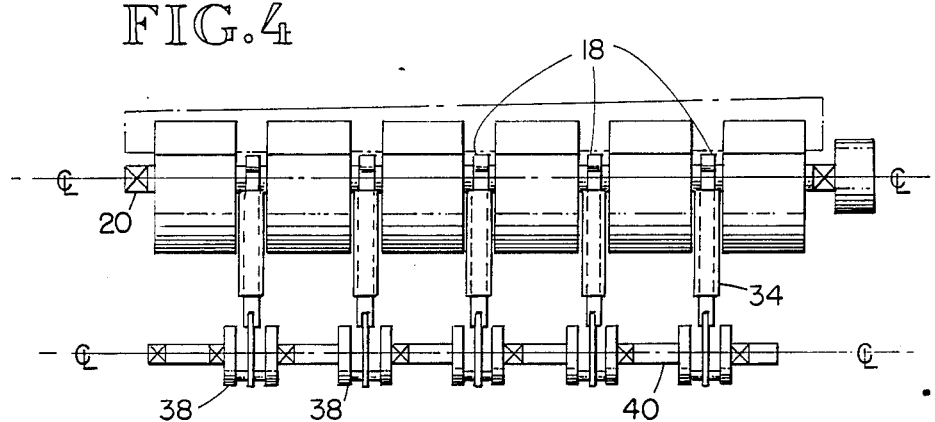
FIG. 4 is a front elevation view of the apparatus of the present invention.

Referring to the Figures, the apparatus can be described. A log singulator, generally designated as 10, is shown, located between a feeder 12 and an outfeed or discharge station 14. Logs to be singulated are received by feeder 12 from an intake station or log deck (not shown). Singulator 10 is comprised of a plurality of rotating drums 16 and a plurality of lifting and separating bars 18. Preferably, the number of bars 18 and rotating drums 16 would be greater than two as shown in FIGS. 3 and 4, although the invention can be practiced using one lifting bar 18 and two rotating drums 16. The drums 16 are longitudinally spaced on a shaft 20. Shaft 20 has its longitudinal axis substantially parallel to the longitudinal axes of the logs to be singulated. As shaft 20 rotates clockwise, the plurality of rotating drums 16 also rotate clockwise. Shaft 20 would be connected to suitable drive means (not shown) which would cause its rotation and would be controlled by an operator. The rotating drums 16 have two perimeter portions 22 and 24 which are substantially identical and diametrically opposed. The perimeter portions 22 and 24 have first chord stretches 26 and 28 respectively, and second chord stretches 30 and 32 respectively as best shown in FIGS. 1 and 2. First chord stretches 26 and 28 are somewhat shorter than second chord stretches 30 and 32. The first chord stretches 26 and 28 meet the second chord stretches 30 and 32 respectively such that an outwardly facing obtuse angle is formed at their juncture. As shown in FIG. 1, the chord stretches are used to support and guide a log reaching the rotating drums as the drums 16 are rotated to the discharged station 14. The entire series of rotating drums 16 are rotated together during operation of the apparatus.

The lifting and separating bars 18 are arranged between the drums 16 in the longitudinal direction. Compared with the rotating drums 16, only one bar 18 is necessary to practice the invention, although for obvious reasons a plurality would be most useful. The bars 18 are connected by coupling 36 to a pulley 38 which in turn is connected to a shaft 40. Shaft 40 has a longitudinal axis parallel to the longitudinal axes of both the logs to be singulated and the shaft so controlling the rotating drums 16. The bars 18 are arranged so that rotation of shaft 40 and pulley 38 drive the bars 18 in the vertical direction both upwards and downwards. Bar guides 34 with guide rollers 42, 44, 46 and 48 are provided which keep the bars 18 in vertical direction as shaft 40 rotates. Bar guide 34 would be attached to the frame of the apparatus. Pulley 38 is connected by a drive belt 52 to a pulley 50 pinned to shaft 20. Rotation of pulley 50, therefore, during operation of the apparatus results in consequent rotation of pulley 38 and shaft 40, in turn resulting in vertical movement of the bars 18. Preferably, pulleys 50 and 38 are sized so that one complete rotation of pulley 50 results in 2 complete rotations of pulley 38 for a two perimeter portion drum. If drums 16 have other than two perimeter portions, the timing or sequencing between pulley 50 and pulley 38 would be adjusted accordingly. For example, a four perimeter portion or four "pocket" drum would result in pulley 38 rotating 4 times for every rotation of pulley 50. Thus, for every rotation of rotating drums 16, two cycles of up and down movement of bars 18 occurs for a two pocket drum. The rotating drums 16 and bars 18 are timed so that the lifting bars 18 are in a first lower position when a first chord stretch 26 or 28 of perimeter portions 22 and 24 is transverse to the bars 18 as shown in FIG. 1. As the drums 16 are rotated, the bars 18 move upward as shown in FIG. 2 to a second upper position in which the bars 18 have fed any log having its center of gravity downstream of the separating surface 53 of the bumping bars 18. Further, the bars 18 as they move from the lower position shown in FIG. 1 to the upper position shown in FIG. 2 serve as a barrier to prevent upstream logs from reaching the rotating drums 16. To supply logs from the infeed station (not shown) to the singulator 10, a conventional feeder 12 may be used. In this feeder 12 well known in the art, but not shown in the figures, a step portion in the flow stream may be provided which limits the number of logs fed to the singulator. A kicker (not shown) may also be provided which kicks the last log into the singulator 10 so that logs are received consecutively. Although this type of feeder 12 is preferable, other feeders or feeding arrangements may be used in the practice of the present invention.

The operation of the apparatus will now be described. Logs from an infeed station are received by feeder 12, which feeds the singulator 10. Logs are then received by the rotating drums 16 and supported by either perimeter portion 22 or perimeter portion 24 defined by the first and second chord stretches 26 and 28 or 30 and 32, respectively, as the drums 16 rotate and the lifting and separating bars 18 move to the position shown in FIG. 1. At this point, the chord stretches 26 and 28 in FIG. 1 support the log to be singulated and the bars 18 are in their lower position not obstructing any logs. As drum 16 rotates further clockwise, the bars 18 move upward feeding or advancing any log having its center of gravity downstream of the separating surface 53 of the bars 18 into the rotating drums 16. Simultaneously, the bars 18 form a barrier to upstream side logs, preventing them from contacting the rotating drums 16 at this point in the cycle as best shown in FIG. 2. Logs supported by the chord stretches 26 and 28 or 30 and 32 are eventually deposited on at the outfeed or discharge station 14. At this point, the logs would be conveyed end to end on a conveyor (not shown) to the next processing station. Operation of the singulator would continue without reciprocating motion as the bars 18 cycle twice for each rotation of the drums 16 in this embodiment.

To accommodate varying log diameter sizes, a power cylinder 54 could be connected to the bar guide 34 in a conventional manner with obvious minor modifications to the mounting frame. The bar guide 34 and bars 18 then can be moved horizontally in response to movement caused by the cylinder 54. Larger or smaller diameter log sizes could, therefore, be accommodated without time consuming part replacement.

It should be noted that different conventional means such as an air cylinder or the like can be used to actuate vertical movement of bars 18. The drive belt 52 connecting the drums 16 and the bars 18 can be eliminated and the bars 18 and drums 16 timed such that bars 18 would cycle a number of cycles equal to the number of perimeter portions or "pockets" of drums 16 for every cycle of drums 16. Typically, if drums 16 had two such perimeter portions or "pockets" as shown in the figures, the bars 18 would cycle twice for every cycle of the drums 18 without a direct connection therebetween assuming drums 16 and bars 18 are suitably synchronized. Also, pulleys 38 and s50 could be replaced by suitable gears with a drive chain replacing drive belt 52. Operation of the apparatus remains essentially the same whether hears or pulleys are used.

What is claimed is:

1. Apparatus for singulating logs between an infeed and outfeed station comprising:
    a. at least two longitudinally displaced rotating drums, said drums having at least one perimeter portion defined by a first and second chord stretch, said first and second chord stretch joining at an outwardly facing obtuse angle, said rotating drums being connected to a first shaft with the longitudinal axis of said first shaft parallel to the longitudinal axis of the logs to be singulated, said rotating drums located adjacent the outfeed station;
    b. bar means having a separating surface and connected to a second shaft, whereby rotation of said second shaft produces vertical translational movement of said bar means, said second shaft having a longitudinal axis parallel to the longitudinal axis of said first shaft and the logs to be singulated, said bar means operatively associated with said rotating drum such that when said first chord stretch is transverse to said bar means, said bar means is at a first lower position below said first and second chord stretch allowing a log to rest on said first and second chord stretch and as said rotating drums continue to rotate in the same direction, said bar means moves vertically to a second upper position whereby a log resting on said first and second chord stretch advances toward the outfeed station if the center of the log is downstream of the separating surface of said bar means and logs not resting on said first and second chord stretch of said rotating drum are prevented from contacting said rotating drum;
    c. transmission means connected to said first and second shafts whereby rotation of said first shaft produces rotation of said second shaft and consequently vertical translational movement of said bar means; and
    d. adjusting means connected to said bar means whereby said bar means may be adjusted horizontally to accommodate a range of log diameter sizes.

2. Apparatus for singulating logs between an infeed and outfeed station comprising
    a. At least two longitudinally displaced rotating drums, said drums having at least one perimeter portion defined by a first and second chord stretch, said first and second chord stretch joining at an outwardly facing obtuse angle, said rotating drums located adjacent the outfeed station;
    b. bar means having a separating surface, said means operatively associated with said rotating drums such that when said first and second chord stretch is transverse to said means, said means is at a first lower position below said first chord stretch allowing a log to rest on said first and second chord stretch and as said rotating drums continue to rotate in the same direction, said means moves vertically to a second upper position whereby a log resting on said first and second chord stretch advances toward the outfeed station if the center of the log is downstream of the separating surface of said means and logs not resting on said first and second chord stretch of said rotating drums are prevented from contacting said rotating drums; and
    c. adjusting means connected to said bar means whereby said bar means may be adjusted horizontally to accommodate a range of log diameter sizes.

* * * * *